United States Patent
Lee

(10) Patent No.: US 7,830,054 B2
(45) Date of Patent: Nov. 9, 2010

(54) SPINDLE MOTOR AND FABRICATING METHOD THEREOF

(75) Inventor: Tae Wook Lee, Gwangsan-gu (KR)

(73) Assignee: LG Innotek Co., Ltd., Seoul (KR)

( * ) Notice: Subject to any disclaimer, the term of this patent is extended or adjusted under 35 U.S.C. 154(b) by 352 days.

(21) Appl. No.: 11/910,205

(22) PCT Filed: Apr. 24, 2006

(86) PCT No.: PCT/KR2006/001530
§ 371 (c)(1),
(2), (4) Date: Sep. 28, 2007

(87) PCT Pub. No.: WO2006/115358
PCT Pub. Date: Nov. 2, 2006

(65) Prior Publication Data
US 2008/0169709 A1 Jul. 17, 2008

(30) Foreign Application Priority Data
Apr. 25, 2005 (KR) .................... 10-2005-0034195

(51) Int. Cl.
*H02K 7/08* (2006.01)
(52) U.S. Cl. ..................... 310/90; 310/67 R
(58) Field of Classification Search ............ 310/67 R, 310/90, 71
See application file for complete search history.

(56) References Cited

U.S. PATENT DOCUMENTS

| | | | | |
|---|---|---|---|---|
| 5,256,922 A * | 10/1993 | Tanaka et al. | ................. | 310/71 |
| 5,264,748 A * | 11/1993 | Ootsuka et al. | ............... | 310/90 |
| 5,519,270 A | 5/1996 | Yamada et al. | | |
| 5,910,693 A * | 6/1999 | Park | ......................... | 310/67 R |
| 6,100,612 A * | 8/2000 | Satoh | ...................... | 310/49.01 |
| 6,107,717 A * | 8/2000 | Lin et al. | ...................... | 310/90 |
| 6,242,830 B1 * | 6/2001 | Katagiri | ....................... | 310/90 |
| 6,545,382 B1 | 4/2003 | Bennett | | |
| 6,661,131 B2 * | 12/2003 | Fukutani | ..................... | 310/51 |

* cited by examiner

*Primary Examiner*—Dang D Le
(74) *Attorney, Agent, or Firm*—Saliwanchik, Lloyd & Saliwanchik

(57) ABSTRACT

A spindle motor, obtaining more accurate shaft perpendicularity and more convenient assembling process, is disclosed, the spindle motor includes: a rotor; a bearing housing into which the rotor is inserted; a base plate fixing the bearing housing; a housing guide fixed to the base plate, the housing guide having at least one vertical portion guiding an outer surface of the bearing housing; a printed circuit board mounted on the base plate; and a stator coupled to an outer surface of the bearing housing and supplied with power from the printed circuit board.

19 Claims, 2 Drawing Sheets

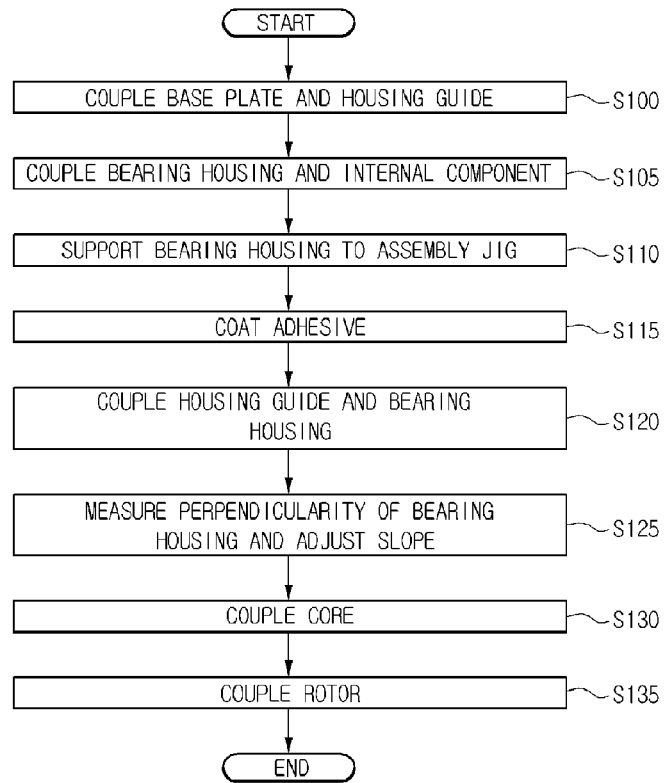
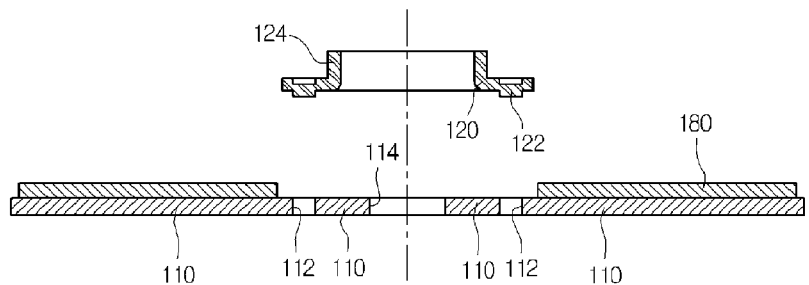
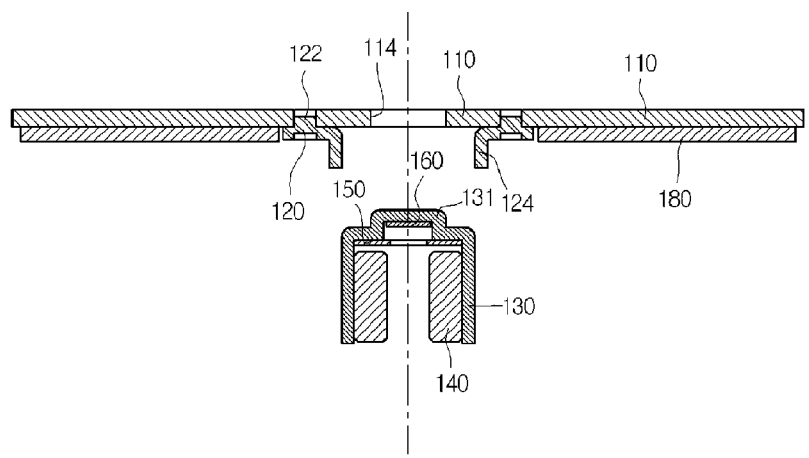

SPINDLE MOTOR AND FABRICATING METHOD THEREOF

CROSS-REFERENCE TO RELATED APPLICATION

This application is the U.S. national stage application of International Patent Application No. PCT/KR2006/001530, filed Apr. 24, 2006, the disclosure of which is hereby incorporated by reference in its entirety.

TECHNICAL FIELD

The present invention relates to a spindle motor, and more particularly, to a bearing housing for supporting a rotor and a base plate to which the bearing housing is fixed.

BACKGROUND ART

Spindle motors are widely used in electronic appliances (e.g., a projection television, a hometheater device, a drive for a computer, etc.) requiring precisely rotational devices. The spindle motors are small in size and can rotate at high speed. Also, the spindle motors are easy to precisely control and have low power consumption. Because of these advantages, the use of the spindle motors is expected to increase.

Hereunder, a related art spindle motor will be described.

FIG. 1 is a sectional view of a related art slim-type spindle motor.

Referring to FIG. 1, the related art slim-type spindle motor 10 includes a base plate 11, a printed circuit board (PCB) 12, a bearing housing 13, a bearing 14, a core 18, a washer 15, a thrust plate 16, and a thrust stopper 17. Also, a rotor is inserted into the bearing 14 to perform a rotational movement.

An assembly process of the slim-type spindle motor 10 will be described below. First, the bearing 14 is press-fit into the bearing housing 13. The washer 15, the thrust plate 16, and the thrust stopper 17 are assembled in a lower side of the bearing housing 13. Thereafter, the bearing housing 13 is coupled to the base plate 11. At this time, the thrust stopper 17 and the base plate 11 are coupled to end portions a and b of the bearing housing 13 by caulking.

Also, the core 18 is coupled to the bearing housing 13 in a state that the PCB 12 is fixed to the base plate 11. The core 18 is supplied with power from the PCB 12.

After the stator is assembled through the above-described processes, the rotor (not shown) is inserted into the bearing housing 13. The rotor includes a shaft, a rotor yoke, and a permanent magnet. The rotor is rotated by a repulsive magnetic force between the core 18 and the rotor.

Preferably, the bearing housing 13 and the base plate 11 are exactly perpendicular to each other. However, since the bearing housing 13 is inclined at an angle ranging from the minimum 2~3' to the maximum 10' with respect to an imaginary vertical line, a disk rotated by the spindle motor 10 collides against an inside of a drive.

To solve the above problems, a process for correcting a shaft perpendicularity is carried out. That is, after the bearing housing 13 is finally assembled, it is forcibly pressed in a state that the bearing housing 13 is inserted into an assembly jig. In this process, a physical press is applied to the bearing housing 13 on the basis of three points of the base plate 11. This process is called a "shaft perpendicularity adjusting process".

However, when an excessive force is applied during the shaft perpendicular adjusting process, the bearing housing 13 and the bearing 14 may be deformed and the shaft may be again inclined by a spring-back shape of the assembly structure even after the shaft perpendicularity is corrected.

Also, among the entire processes of manufacturing the spindle motor 10, the shaft perpendicularity adjusting process is complicate and its accuracy is difficult to obtain. That is, the shaft perpendicularity adjusting process often causes defective spindle motors and decreases the productivity of the spindle motors.

A structure of another related art spindle motor, namely half height spindle motor, will now be described.

FIG. 2 is a sectional view of a related art half height spindle motor.

Referring to FIG. 2, the half height spindle motor 20 includes a bearing housing 21, a base plate 22, a PCB 23, a thrust plate 24, a bearing 25, and a core 26.

Specifically, the bearing housing 21 has a thrust stopper integrally formed on a lower surface, without separate thrust stopper as shown in FIG. 1, and is press-fit into the base plate 22 including a burred portion c.

Also, the thrust plate 24 and the bearing 25 are inserted through an upper portion of the bearing housing 21. The core 26 is not supported by the PCB 23, but is adhered to the bearing housing 21 by an adhesive, or press-fit into the bearing housing 21.

However, when the core 26 is adhered to or press-fit into the bearing housing 21 without any additional supporting structure, the adhesive takes a lot of time to harden. When a gap is formed between the core 26 and the housing 21, the press-fit is impossible, or they are coupled at an incorrect position. Moreover, when the inner diameter of the core 26 is too small or the outer diameter of the housing 21 is too large, a large amount of press-fit is applied, causing the deformation of the core 26.

Meanwhile, the bearing supporting structure such as the half height spindle motor of FIG. 2 may be applied to the slim-type spindle motor 10 of FIG. 1. However, since the base plate 11 used in the slim-type spindle motor is relatively thin (about 0.6-0.8 mm), the base plate 11 may be deformed by the press-fit. Thus, this case is difficult to actually apply. In order to form the burred portion c on the base plate 11 of the slim-type spindle motor 10, the base plate 11 must be thicker. Accordingly, it is difficult to fabricate the spindle motor with slim profile.

Due to these problems, it is difficult to apply the bearing supporting structure of the half height spindle motor to the slim-type motor.

DISCLOSURE OF INVENTION

Technical Problem

An object of the present invention is to provide a spindle motor capable of correcting a shaft perpendicularity during an assembly process and a fabricating method therefore. Also, the spindle motor can have an improved operating reliability because of the absence of a shaft perpendicularity adjusting process.

Another object of the present invention is to provide a spindle motor in which a bearing housing, a base plate, and a core can be assembled at their correct positions and an assembly operation is convenient, and a fabricating method therefore.

A further another object of the present invention is to provide a spindle motor that can provide an increased convenience of assembly and reduce a manufacturing cost, and a fabricating method thereof. That is, in the spindle motor, parts of a stator can be assembled conveniently by a simple method, such as a welding, an adhesion, and a press-fit.

Technical Solution

In an aspect of the present invention, there is provided a spindle motor including: a rotor; a bearing housing into which the rotor is inserted; a base plate fixing the bearing housing; a housing guide fixed to the base plate, the housing guide having at least one vertical portion guiding an outer surface of the bearing housing; a printed circuit board mounted on the base plate; and a stator coupled to an outer surface of the bearing housing and supplied with power from the printed circuit board.

In another aspect of the present invention, there is provided a method for fabricating the spindle motor, including: providing a single assembly by connecting a base plate to a housing guide; and moving the single assembly toward the bearing housing in a state that a opening portion of the bearing housing having a cup shape is supported to a assembly jig, such that a shaft perpendicularity is corrected by supporting a first portion of the bearing housing to the base plate and supporting a second portion of the bearing housing to the housing guide.

Advantageous Effects

According to the present invention, since the shaft perpendicularity adjusting process need not be separately performed after the motor is completely assembled, it is possible to prevent the change of the shaft perpendicularity when the motor is used in products and also prevent the defective of the motor components that may be caused while adjusting the shaft perpendicularity.

Also, the present invention can obtain the accurate shaft perpendicularity and each component of the motor can be coupled and fixed at the correct positions without excessive tolerance management.

In addition, the production of defective products can be reduced and the number of the manufacturing processes is reduced, thereby increasing the productivity of the motor. Moreover, while the thickness of the spindle motor is minimized, the spindle motor can maintain the stable performance and its lifetime can be extended.

BRIEF DESCRIPTION OF THE DRAWINGS

The accompanying drawings are included to provide a further understanding of the invention. In the drawings:

FIG. 4 is a flowchart illustrating a method of fabricating a spindle motor according to an embodiment of the present invention;

FIG. 5 is a sectional view showing an assembled state of a housing guide and a base plate according to an embodiment of the present invention; and FIG. 6 is a sectional view showing an assembled state of a base plate and a bearing housing according to an embodiment of the present invention.

BEST MODE FOR CARRYING OUT THE INVENTION

Hereinafter, a spindle motor and a fabricating method thereof according to the present invent will now be described in detail with reference to the accompanying drawings.

Figure 1:
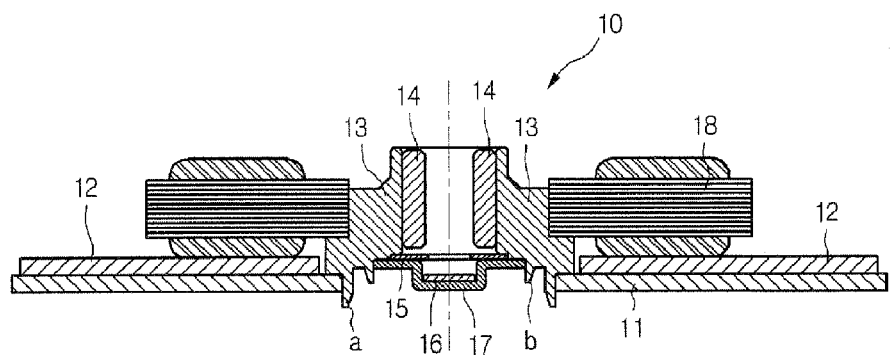
FIG. 1 is a sectional view of a related art slim-type spindle motor.
Figure 2:
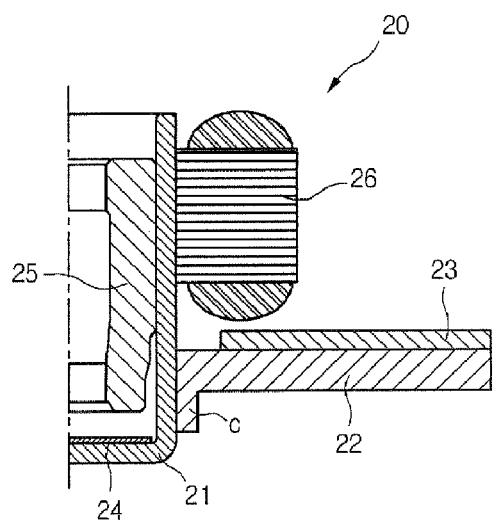
FIG. 2 is a sectional view of a related art half height spindle motor.
Figure 3:
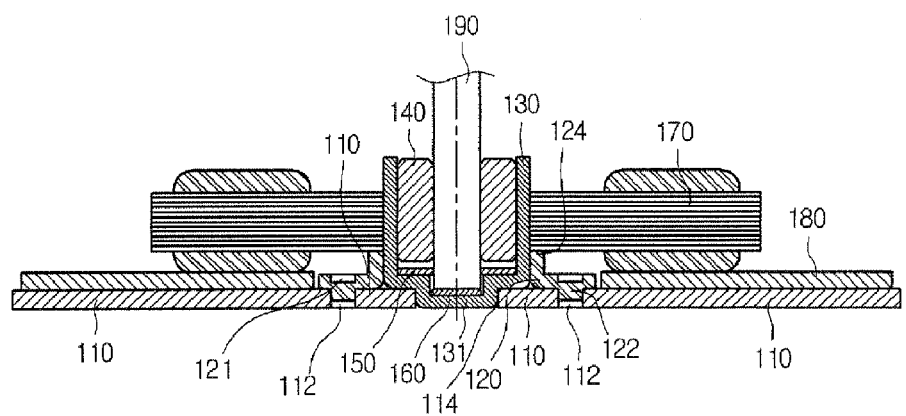
FIG. 3 is a sectional view of a spindle motor according to an embodiment of the present invention.

FIG. 3 is a sectional view of a spindle motor according to the present invention.

Referring to FIG. 3, the spindle motor includes a base plate 110, a PCB 180, a housing guide 120, a bearing housing 130, a bearing 140, a washer 150, a thrust plate 160, and a core 170. The spindle motor further includes a rotor 190 in an inside of the bearing 140. The rotor 190 is rotated by an electromagnetic force generated between the rotor 190 and a coil wound around the core as a stator.

The components of the spindle motor will be described below in detail.

The bearing housing 130 is provided in a cup shape by a deep drawing process. The bearing housing 130 has a downwardly convex portion 131 on a lower surface. The deep drawing process is a technique to press a sheet into a die using a punch. That is, the deep drawing process is to process the sheet in a three-dimensional convex shape. The bearing housing 130 manufactured by the deep drawing process is more efficient than that manufactured by the cutting processing. The convex portion 131 formed in the lower portion of the cup-shaped bearing housing 130 serves as the thrust stopper.

Also, the bearing housing receives the thrust plate 160, the washer 150, and the bearing 140. The thrust plate 160 is disposed inside the convex portion 131 formed at the lower portion of the bearing housing 130. And, The thrust plate 160 supports an end portion of the rotor 190 passing through the bearing 140 and reduces friction when the rotor 190 rotates. The washer 150 prevents a backflow of oil received in the bearing housing 130, and the bearing 140 reduces a friction force when the rotor 190 is rotated at high speed.

Also, the base plate 110 has a center hole 114 at a center portion such that the bearing housing 130, specifically the convex portion 131 of the bearing housing 130, is received in the center hole 114. A plurality of inserting holes 112 are formed at an outside of the center hole 114 such that the housing guide 120 is received in the inserting holes 112. The convex portion 131 formed at the lower portion of the bearing housing 130 is inserted into the center hole 114, and an inserting protrusion 122 formed in the housing guide is inserted into the inserting hole 112 and connected thereto. It is preferable that three to six inserting holes 112 be formed.

Meanwhile, the housing guide 120 is manufactured in a doughnut-shaped plate to surround the bearing housing 130 and its inner end portion contacting the bearing housing 130 is bent to form a burred portion 124. Of course, the burred portion 124 may be provided using another method, except the burring process.

Also, the housing guide 120 includes the inserting protrusion 122 formed at a position corresponding to the inserting hole 112 of the base plate 110, and the inserting protrusion 122 is inserted into the inserting hole 112. A dent 121 of the housing guide 120 is over the inserting hole 112. As described above, it is preferable that three to six inserting protrusions 112 are formed. The inserting hole 112 of the base plate 110 and the inserting protrusion 122 of the housing guide 120 are firmly coupled by a press-fit or a press-fit and a welding with a predetermined assembly tolerance.

After the housing guide 120 is fixed to the base plate 110, the bearing housing 130 is coupled. The convex portion 131 of the bearing housing 130 is inserted into the center hole 114 of the base plate 110, and the burred portion 124 of the housing guide 120 is coupled while guiding an outer surface of the bearing housing 130.

When the bearing housing 130 is press-fit into the housing guide 120 with an assembly tolerance, the bearing 140 received in the bearing housing can be contracted so that the rotation of the shaft is interrupted. Therefore, it is preferable that an inner diameter of the burred portion 124 be a little larger than an outer diameter of the bearing housing 130. To increase the coupling strength of the bearing housing 130 and the housing guide 120, an adhesive is coated on a contact surface between the burred portion 124 and the bearing housing 130, such that the housing guide 120 is firmly coupled to the bearing housing 130.

Also, the PCB 180 is mounted on the base plate 110, and the core 170 is mounted on the PCB 180. A coil is wound around the core 170 and supplied with power from the PCB 180. When the power is supplied to the coil of the core 170, an electromagnetic force is formed and a repulsive force is applied between the rotor 190 and a permanent magnet, so that the rotor 190 rotates.

Meanwhile, when the core 170 is mounted, it is fixed by a support (not shown) protruding upward from the PCB 180 and is coupled to the outer surface of the bearing housing 130. At this time, an upper end portion of the burred portion 124 of the housing guide 120 supports the contact portion of the core 170 in an upper direction, such that the mounting position of the core 170 is guided. In other words, the core 170 is supported by the upper portion of the burred portion 124. Thus, the mounting position of the core 170 can be accurately set by the housing guide 120 and a weight of the core 170 can be somewhat supported by the housing guide 120.

Hereinafter, the method for fabricating the spindle motor according to the present invention will now be described in detail.

FIG. 4 is a flowchart illustrating the method for fabricating the spindle motor according to the present invention.

Referring to FIG. 4, in operation S100, the inserting protrusion 122 of the housing guide 120 is inserted into the inserting hole 112 of the base plate 110. At this time, the inserting protrusion 122 is press-fit or inserted into the inserting hole 112 and fixed by a welding. The assembling process of the base plate 110 and housing guide 120 will be fully understood by a side sectional view of the spindle motor shown in FIG. 5. Also, in operation S105, apart from the assembling process of base plate 110 and housing guide 120, the thrust plate 160, the washer 150, and the bearing 140 are inserted/fixed to the bearing housing 130. In operations S100 and S105, although a plurality of components are installed in the bearing housing 130 after assembling the base plate 110 and the housing guide 120, this is merely illustrative. For example, the operations S100 and S105 may be reversed or separately performed.

Then, in operation S110, a position of the bearing housing 130 is supported at a shaft guide (not shown) formed on an assembly jig in a state that the bearing housing 130 is reversed. In operation S115, after the bearing housing 130 is supported at the shaft guide, an adhesive is coated on the inside of the burred portion 124 of the housing guide 120 and the outer surface of the bearing housing 130 contacting the burred portion 124. Also, the adhesive may be coated on either of the two surfaces.

Then, in operation S120, the base plate 110 coupled to the housing guide 120 is also coupled to the bearing housing 130 in an upward direction in a state that the base plate 110 is reversed. At this time, the convex portion 131 of the bearing housing 130 is inserted into the center hole 114 of the base plate 110 and the side surface of the bearing housing 130 is adhered to the burred portion 124.

The process of coupling the bearing housing 130 and the housing guide 120 is illustrated in detail in FIG. 6.

In operation S125, before the adhesive coated on the bearing housing 130 and the contact portion of the housing guide 120 is hardened, the perpendicularity of the bearing housing 130 with respect to the horizontal plane of the base plate 110 is measured. Then, the slope of the bearing housing 130 is accurately adjusted. Because the process of receiving the bearing guide 120 in the bearing housing 130 and the process of accurately adjusting the perpendicularity of the bearing housing 130 are carried out simultaneously, user's convenience is more improved. Also, because a process of adjusting the perpendicularity is not required later, the components such as the bearing 140 will not be damaged. Specifically, in a state that the bearing housing 130 is received in the assembly jig, the base plate 110 fixed to the housing guide 120 is fixed to the bearing housing 130 while the perpendicularity of the bearing housing 130 is accurately adjusted. Therefore, the assembling process is convenient and the accurate perpendicularity can be obtained. Further, because the base plate 110 is coupled to the bearing housing 130 in an upward direction in a state that the bearing housing 130 is reversed. Therefore, the process of correcting the perpendicularity with respect to the horizontal plane of the base plate 110 becomes more convenient.

In operation S130, the core 170 is fixed to the supporting structure provided on the PCB 180. The lower end portion of the core 170 is mounted in the end portion of the burred portion 124 of the housing guide 120, and the inner surface of the core 170 is coupled to the outer surface of the bearing housing 130. The inner surface of the core 170 and the outer surface of the bearing housing 130 can be coupled more firmly by the adhesive. The mounting position of the core 170 can be accurately set at the burred portion 124 of the housing guide 120 and the position of the core 170 can be somewhat supported by the burred portion 124. Thus, the core 170 can be mounted conveniently, accurately and reliably.

In operation S135, after the stator of the spindle motor is completely assembled through the above-described procedures, the stator is separated from the assembly jig, and the rotor 190 is inserted into the bearing 140 of the bearing housing 130.

Meanwhile, the order of the process of assembling the PCB 180 and the base plate 110 is not fixed. However, it is preferable that the PCB 180 be fixed to the base plate 110 before the housing guide 120 is coupled thereto.

MODE FOR THE INVENTION

According to the present invention, since the bearing guide is further provided as a separate structure to support the bearing housing, the bearing housing is supported by the housing guide and the core is supported to the housing guide. Therefore, the perpendicularity of the rotor can be accurately adjusted. Also, the present invention can be implemented in various constructions.

Although the bearing housing and the housing guide, and the core and the bearing housing are adhered and fixed together, they can also be fixed to each other by a welding or a press-fit. However, in view of the improvement and correction of the perpendicularity, the adhering method is preferable.

Although the housing guide and the base plate, and the bearing housing and the base plate are coupled together by the press-fit and/or the welding, they can also be fixed each other by adhering or other coupling method. However, in view of the firm coupling, the press-fit and/or the welding are/is preferable.

INDUSTRIAL APPLICABILITY

Since the shaft perpendicularity adjusting process need not be separately performed after the motor is completely assembled, the prevent invention can prevent the change of the shaft perpendicularity when the motor is used in products and can prevent the defective of the motor components that may be caused while adjusting the shaft perpendicularity.

Also, the present invention can obtain the accurate shaft perpendicularity and correct the shaft perpendicularity conveniently. In addition, the production of defective products can be reduced and the number of the manufacturing processes is reduced, thereby increasing the productivity of the motor. Moreover, while the thickness of the spindle motor is minimized, the spindle motor can maintain the stable performance and its lifetime can be extended.

The invention claimed is:

1. A spindle motor, comprising:
   a rotor;
   a bearing housing into which the rotor is inserted;
   a base plate fixing the bearing housing, wherein a lower surface of the bearing housing contacts a top surface of the base plate;
   a housing guide fixed to the base plate, wherein the housing guide has at least one vertical portion for guiding an outer surface of the bearing housing;
   a printed circuit board mounted on the base plate; and
   a stator coupled to the outer surface of the bearing housing and supplied with power from the printed circuit board,
   wherein the housing guide is fixed to the base plate at a portion of the base plate at an inner side of where the printed circuit board is mounted on the base plate.

2. The spindle motor according to claim 1, wherein the at least one vertical portion of the housing guide is a burred portion formed by a half blanking process.

3. The spindle motor according to claim 1, wherein the stator comprises a core disposed on the at least one vertical portion of the housing guide.

4. The spindle motor according to claim 1, wherein the housing guide has a portion inserted into the base plate such that the housing guide is fixed to the base plate.

5. The spindle motor according to claim 1, wherein the housing guide comprises a plurality of protrusions formed in a downward direction, and wherein the base plate comprises a plurality of holes into which the protrusions are inserted.

6. The spindle motor according to claim 1, wherein the housing guide has a portion inserted into the base plate and fixed to the base plate by a welding.

7. The spindle motor according to claim 1, wherein the housing guide has a portion press-fit into the base plate.

8. The spindle motor according to claim 1, wherein the housing guide and the outer surface of the bearing housing are adhered to each other by an adhesive.

9. The spindle motor according to claim 1, wherein the bearing housing is formed in a cup shape and has a closed lower surface serving as a thrust stopper.

10. The spindle motor according to claim 9, wherein the bearing housing is manufactured by a deep drawing process.

11. The spindle motor according to claim 1, wherein the bearing housing comprises a convex portion protruding at a lower portion of the bearing housing, and wherein the base plate comprises a hole into which the convex portion is inserted such that the convex portion is fixed to the base plate.

12. The spindle motor according to claim 11, wherein the convex portion is press-fit into the hole.

13. The spindle motor according to claim 11, wherein a contact portion of the convex portion and the hole are welded.

14. The spindle motor according to claim 1, wherein the stator comprises a core, wherein a contact surface of the core is adhered to the bearing housing.

15. A spindle motor, comprising:
    a rotor;
    a bearing housing into which the rotor is inserted, wherein a lower surface of the bearing housing contacts a top surface of a base plate, the base plate fixing the bearing housing;
    a housing guide fixed to the base plate, wherein the housing guide has at least one vertical portion for guiding an outer surface of the bearing housing;
    a printed circuit board mounted on the base plate; and
    a stator coupled to the outer surface of the bearing housing and supplied with power from the printed circuit board,
    wherein the housing guide is contacted with the bearing housing and the stator.

16. The spindle motor according to claim 15, wherein a top surface of the housing guide is contacted with a lower surface of the stator.

17. The spindle motor according to claim 15, wherein the bearing housing has a uniform thickness.

18. The spindle motor according to claim 15, wherein the housing guide comprises a plurality of protrusions inserted into a plurality of holes of the base plate.

19. The spindle motor according to claim 18, wherein the housing guide has a dent over the plurality of holes of the base plate.

* * * * *